(12) United States Patent
King

(10) Patent No.: US 7,405,381 B2
(45) Date of Patent: Jul. 29, 2008

(54) REAL-TIME IMAGING AND SPECTROSCOPY DURING MICROWAVE ASSISTED CHEMISTRY

(75) Inventor: Edward Earl King, Charlotte, NC (US)

(73) Assignee: CEM, Corporation, Matthews, NC (US)

( * ) Notice: Subject to any disclaimer, the term of this patent is extended or adjusted under 35 U.S.C. 154(b) by 253 days.

(21) Appl. No.: 11/209,970

(22) Filed: Aug. 23, 2005

(65) Prior Publication Data

US 2007/0062934 A1    Mar. 22, 2007

(51) Int. Cl.
*H05B 6/68* (2006.01)
*G05D 16/08* (2006.01)

(52) U.S. Cl. .................. 219/679; 219/711; 219/710; 422/21; 422/82.05; 374/149

(58) Field of Classification Search .............. 219/679, 219/746, 710–712, 702; 422/21, 82.05, 82.12; 374/149
See application file for complete search history.

(56) References Cited

U.S. PATENT DOCUMENTS

| | | | | |
|---|---|---|---|---|
| 4,963,709 | A | * | 10/1990 | Kimrey, Jr. ................ 219/686 |
| 5,073,392 | A | | 12/1991 | Atwell et al. |
| 5,108,770 | A | | 4/1992 | Domingues et al. |
| 5,223,289 | A | | 6/1993 | Domingues et al. |
| 5,443,795 | A | * | 8/1995 | Revesz ................... 422/90 |
| 5,796,080 | A | | 8/1998 | Jennings et al. |
| 5,840,583 | A | | 11/1998 | Barclay et al. |
| 5,972,711 | A | | 10/1999 | Barclay et al. |
| 6,084,226 | A | | 7/2000 | Greene et al. |
| 6,210,538 | B1 | | 4/2001 | Knapp et al. |
| 6,227,041 | B1 | | 5/2001 | Collins et al. |
| 6,268,570 | B1 | | 7/2001 | McLendon et al. |
| 6,288,379 | B1 | | 9/2001 | Greene et al. |
| 6,302,577 | B1 | | 10/2001 | Jennings et al. |
| 6,320,170 | B1 | | 11/2001 | Jennings et al. |
| 6,579,501 | B1 | | 6/2003 | Knapp et al. |

(Continued)

FOREIGN PATENT DOCUMENTS

EP    0 852 965 A1    7/1998

(Continued)

OTHER PUBLICATIONS

International Search Report for PCT/US2006/032756 dated Nov. 30, 2006; pp. 1-3.

(Continued)

*Primary Examiner*—Philip H Leung
(74) *Attorney, Agent, or Firm*—Summa, Allan & Addition, P.A.

(57) ABSTRACT

An instrument and associated method are disclosed for conducting microwave assisted chemical reactions. The instrument includes a microwave cavity, preferably a closed microwave cavity, for conducting microwave assisted chemical reactions, and a source for applying microwave radiation within the cavity and to a vessel and its contents. The instrument also includes an illumination source for illuminating the vessel and its contents, as well as a camera or spectrometer for visually observing the vessel and its contents, an infrared detector for monitoring the temperature of the vessel and its contents, and a filter for preventing the illumination source from saturating the infrared detector, thereby enabling concurrent visual observation and infrared monitoring.

16 Claims, 3 Drawing Sheets

U.S. PATENT DOCUMENTS

| | | |
|---|---|---|
| 6,649,889 B2 | 11/2003 | Jennings |
| 6,744,024 B1 | 6/2004 | Hayes et al. |
| 6,866,408 B1 | 3/2005 | Albou |
| 2002/0102738 A1 | 8/2002 | Jennings et al. |
| 2002/0175163 A1 | 11/2002 | Fagrell |
| 2003/0199099 A1 | 10/2003 | King et al. |
| 2004/0009092 A1 | 1/2004 | Diaferia |
| 2004/0026416 A1 | 2/2004 | Fagrell et al. |
| 2004/0173604 A1 | 9/2004 | Fagrell |
| 2004/0222081 A1 | 11/2004 | Tour et al. |

FOREIGN PATENT DOCUMENTS

| | | |
|---|---|---|
| GB | 2 081 442 A | 2/1982 |
| WO | WO 97/13136 | 4/1997 |

OTHER PUBLICATIONS

R.C. Anantheswaran and J.L. Swanderski, Effects of Electrical Shielding and Salt Concentration on Microwave Heating in Cylindrical Containers; Journal of Microwave Power & Electromagnetic Energy; vol. 37, No. 4 2002, pp. 191-206.

D. Constable et al., A New Microwave Reactor Suitable For Organic Synthesis and Kinetics Studies; Journal of Microwave Power & Electromagnetic Energy; vol. 27, No. 4 1992, pp. 195-198.

K.A. Cummings et al., Experimental and Analytical Study of Heating in RF Accelerator Windows; Journal of Microwave Power & Electromagnetic Energy; vol. 32, No. 2, 1997, pp. 101-108.

M. Usami et al., Development of a THz Spectroscopic Imaging System; Phys. Med. Biol. vol. 47, 2002, pp. 3749-3753.

* cited by examiner

| Time | Image | Power | Temperature | Pressure |
|------|-------|-------|-------------|----------|
| 1 |  | $W_1$ | $T_1$ | $P_1$ |
| 2 |  | $W_2$ | $T_2$ | $P_2$ |
| 3 |  | $W_3$ | $T_3$ | $P_3$ |
| 4 |  | $W_4$ | $T_4$ | $P_4$ |
| 5 |  | $W_5$ | $T_5$ | $P_5$ |
| 6 |  | $W_6$ | $T_6$ | $P_6$ |
| 7 |  | $W_7$ | $T_7$ | $P_7$ |

REAL-TIME IMAGING AND SPECTROSCOPY DURING MICROWAVE ASSISTED CHEMISTRY

BACKGROUND

The present invention relates generally to the field of microwave-assisted chemistry techniques, and in particular relates to techniques of monitoring microwave-assisted chemical reactions.

Microwave-assisted chemistry techniques are generally well established in the academic and commercial arenas. Microwaves have some significant advantages in heating (or otherwise supplying energy to) certain substances. In particular, when microwaves interact with substances with which they can couple, most typically polar molecules or ionic species, the microwaves can immediately create a large amount of kinetic energy in such species, which can provide sufficient energy to initiate or accelerate various chemical reactions. Microwaves also have an advantage over conduction heating in that the surroundings do not need to be heated because the microwaves can react instantaneously with the desired species.

The term "microwaves" refers to that portion of the electromagnetic spectrum between about 300 and 300,000 megahertz (MHz) with wavelengths of between about one millimeter (1 mm) and one meter (1 m). These are, of course, arbitrary boundaries, but help quantify microwaves as falling below the frequencies of infrared (IR) radiation and above those referred to as radio frequencies. Similarly, given the well-established inverse relationship between frequency and wavelength, microwaves have longer wavelengths than infrared radiation, but shorter than radio frequency wavelengths.

Because of their wavelength and energy, microwaves have been historically most useful in driving robust reactions or reactions in relatively large sample amounts, or both. Stated differently, the wavelengths of most microwaves tend to create multi-mode situations in cavities in which the microwaves are being applied. In a number of types of chemical reactions, this offers little or no disadvantage, and microwave techniques are commercially well established for reactions such as digestion or loss-on-drying moisture content analysis.

Relatively robust, multi-mode microwave techniques, however, tend to be less successful when applied to small samples of materials. Although some chemistry techniques have the obvious goal of scaling up a chemical reaction, in many laboratory and research techniques, it is often necessary or advantageous to carry out chemical reactions on small samples. For example, the availability of some compounds may be limited to small samples. In other cases, the cost of reactants may discourage large sample sizes. Other techniques, such as combinatorial chemistry, use large numbers of small samples to rapidly gather a significant amount of information, and then tailor the results to provide the desired answers, such as preferred candidates for pharmaceutical compounds or their useful precursors.

Microwave devices with larger, multimode cavities that are suitable for other types of microwave-assisted techniques (e.g., drying, digestion, etc.) are generally less-suitable for smaller organic samples because the power density pattern in the cavity is relatively non-uniform.

Accordingly, the need for more focused approaches to microwave-assisted chemistry has led to improvements in devices for this purpose. For example, in the commercially available devices sold under the assignee's (CEM Corporation, 3100 Smith Farm Road, Matthews, N.C. 28106) DISCOVER®, EXPLORER®, VOYAGER®, NAVIGATOR™, LIBERTY™, and INVESTIGATOR™ trademarks have provided single mode focused microwave devices that are suitable for small samples and for sophisticated reactions such as chemical synthesis.

The very success of such single mode devices has, however, created associated problems. In particular, the improvement in power density provided by single-mode devices can cause significant heating in small samples, including undesired over-heating in some circumstances. The ability to monitor the temperature of a microwave assisted chemical reaction aids in avoiding these difficulties.

One technique for monitoring a temperature change is through the use of infrared (IR) temperature monitoring. An IR detector monitors infrared radiation emitted by the vessel or its contents and can do so without directly contacting the vessel. Accordingly, the detector can be located in a position, either inside or near the cavity, that avoids interference with microwaves. Infrared temperature monitoring can also produce a measurement that is more representative of the entire sample, whereas traditional thermometers and temperature probes can tend to produce temperature measurements for primarily localized areas.

Moreover, because infrared radiation, as previously discussed, has different wavelengths than microwaves, the detector can accurately measure the temperature of the emitted infrared radiation without interfering with the microwave heating process, or vice versa. Temperature probes and traditional thermometers may be affected by microwave heating, resulting in the addition of extra heat to the sample or an inaccurate temperature reading.

As is known to those having ordinary skill in the art, organic reactions are often monitored visually to detect, for example, a color change or the presence of a precipitate. These physical changes are often indicative of the progress of a reaction, including completion, and can aid in determining the time of reaction (rate). For example, lack of a physical change could indicate that more time is needed. Conversely, a physical change occurring earlier than expected could indicate a faster reaction time. The ability to recognize a delayed or early reaction during heating enables the chemist to save time, either by stopping a reaction or by continuing the reaction, thereby avoiding the necessity of repeating the reaction with a longer reaction time. Other physical or chemical changes that are beneficially observed visually include changes in absorbance, emission, light scattering, and turbidity.

The capability to observe visible changes (or the lack thereof) in an ongoing reaction can also provide the opportunity to avoid undesired side reactions and to evaluate and identify optimum reaction conditions, particularly including optimum temperatures or temperature ranges.

Most single mode microwave instruments, however, require closed cavities, thus making direct visual observation of reactions difficult or impossible. Furthermore, a microwave cavity must internally reflect, rather than transmit, the relevant wavelengths of electromagnetic radiation. Thus, cavity walls transparent to visual radiation will generally be (unfavorably) transparent to microwave radiation as well. A transparent cavity will not, of course, contain microwave radiation, regardless of mode.

As an independent problem, and even if cavity walls or wall portions offer some visibility (as in the screened doors of many domestic kitchen microwave ovens), the light sources providing the illumination, such as incandescent, fluorescent, and other common visual sources, often include an infrared component. The presence of the infrared component can— and typically will—interfere with or saturate an infrared temperature detector, thereby compromising or defeating its performance.

SUMMARY

In another aspect, the invention is a method of carrying out microwave assisted chemical reactions including applying microwave radiation within a cavity and to a reaction vessel in the cavity and reactants in the reaction vessel. The method further includes concurrently monitoring infrared radiation emitted from the reaction vessel and reactants to determine the temperature of the vessel contents, while concurrently illuminating and visually monitoring the reactants with wavelengths other than infrared wavelengths.

In yet another aspect, the invention is an apparatus for conducting microwave assisted chemical reactions. The apparatus includes a microwave-transparent vessel in a microwave cavity, a source for applying microwave radiation within the cavity and to the vessel and its contents, and an illumination source for illuminating the vessel and its contents. The apparatus also includes means for visually observing the vessel and its contents, an infrared detector for monitoring the temperature of the vessel or its contents, and means for preventing the illumination source from saturating the infrared detector, thereby enabling concurrent visual observation and infrared monitoring.

In another aspect, the invention is a method of carrying out microwave assisted chemical reactions including placing reactants in a microwave-transparent vessel and positioning the vessel and its contents inside a microwave cavity. The method further includes applying a continuous single mode of microwave radiation within the cavity and to the vessel and its contents while concurrently monitoring infrared radiation emitted from the reactants to determine the temperature of the vessel contents and illuminating and visually monitoring the reactants to determine the progress of a reaction. Additionally, the method includes adjusting the microwave power in response to a monitored change in the reactants in the vessel.

In yet another aspect, the invention is a method of carrying out microwave assisted chemical reactions including applying a continuous single mode of microwave radiation within a cavity and to a reaction vessel in the cavity and reactants in the reaction vessel, and intermittently monitoring infrared radiation emitted from the reaction vessel and the reactants to determine the temperature of the vessel contents, and illuminating and visually monitoring the reactants.

In a further aspect, the invention is an apparatus for conducting microwave assisted chemical reactions in a cavity including a microwave transparent vessel, a source for applying a continuous single mode of microwave radiation within the cavity and to the vessel and its contents, and an illumination source for illuminating the vessel and it contents. The apparatus further includes means for visually observing the vessel and its contents, an infrared detector for monitoring the temperature of the vessel or its contents, and means for preventing the illumination source from saturating the infrared detector.

The foregoing and other aspects and embodiments of the invention will become clearer based on the following detailed description taken in conjunction with the accompanying drawings.

DETAILED DESCRIPTION

The present invention is a method and apparatus for conducting microwave assisted chemical reactions including real-time temperature and visual monitoring. Real-time temperature and visual monitoring provide better control of reaction rate and conditions.

Figure 1:
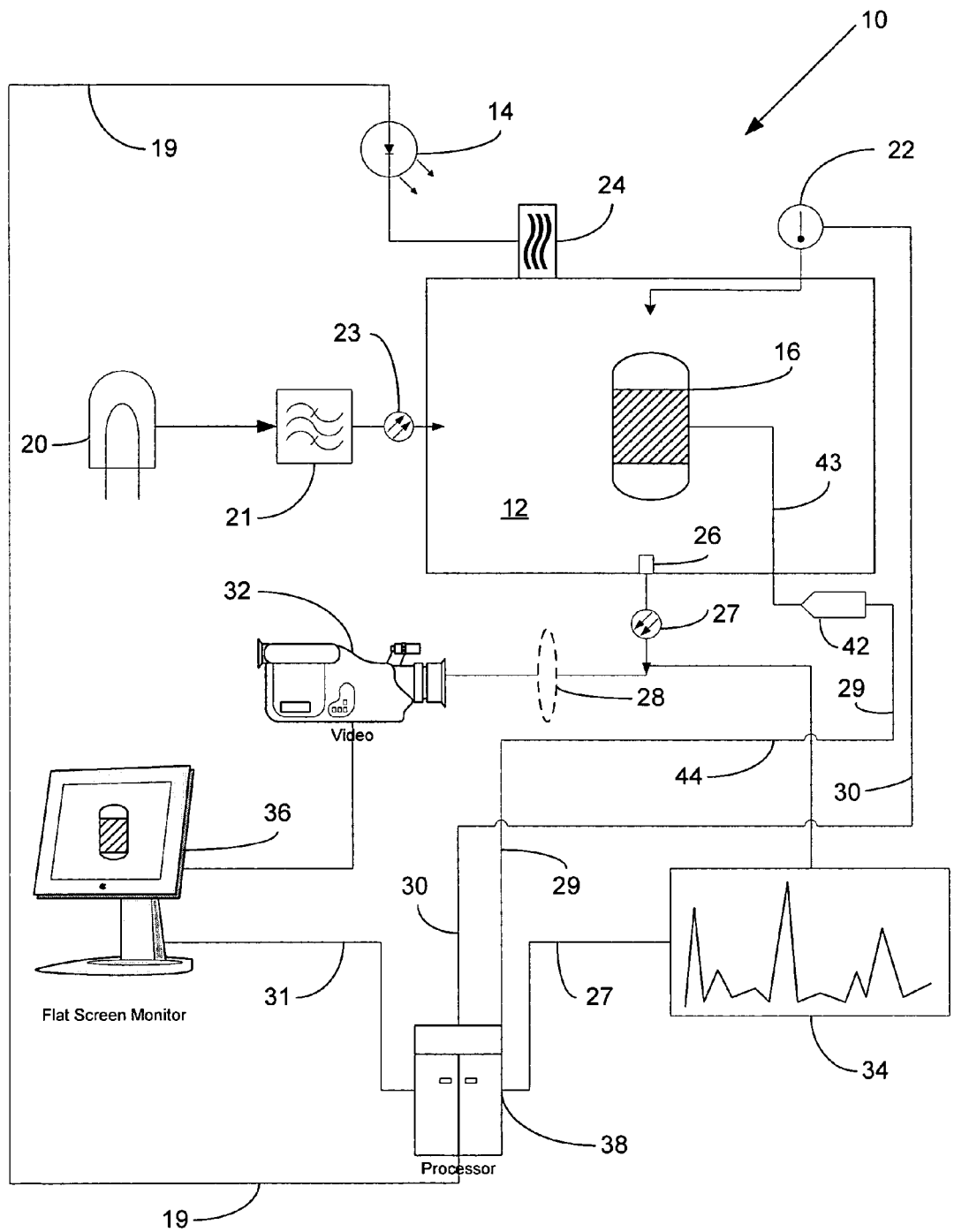
FIG. 1 is a schematic diagram of the elements of an instrument in accordance with one embodiment of the invention.

FIG. 1 is a schematic diagram of one aspect of the invention. According to this aspect, the invention is an instrument broadly designated at 10 for conducting microwave assisted chemical reactions. The instrument 10 includes a microwave cavity 12, preferably a closed microwave cavity, for conducting microwave assisted chemical reactions. The instrument 10 further includes a source, illustrated as the diode 14 for applying microwave radiation within the cavity 12 and to a vessel 16 and its contents. The instrument 10 also includes an illumination source illustrated by the lamp symbol 20 that emits in the visible wavelengths for illuminating the vessel 16 and its contents, as well as means for visually observing the vessel 16 and its contents. The apparatus also includes an infrared detector 22 for monitoring the temperature of the vessel 16 and its contents, and means illustrated as the filter 21 for preventing the illumination source 20 from saturating the infrared detector 22, thereby enabling concurrent visual observation and infrared monitoring.

FIG. 1 shows the illumination source 20, the filter 21 and a fiber optic line 23 entering the cavity 12 separately from the location of the observation port 26 and its related fiber optic 27 and its potential connection to the lens 28, the camera 32 or the spectrometer 34 in a manner discussed further later herein.

It will be understood, of course, that although FIG. 1 illustrates these elements separately for purposes of clarity, a single fiber optic line could be used to carry both the illumination wavelengths from the source to the cavity as well as providing visible access for observation purposes. Accordingly, FIG. 1 is descriptive and exemplary rather than limiting of this and other aspects of the invention.

In some embodiments, the instrument 10 can include a waveguide 24 in communication with the source 14 and the cavity 12 to direct the microwave radiation in the desired orientation.

In another embodiment, the source 14 propagates a continuous single mode of microwave radiation in the cavity 12. Because of the nature of microwaves, which follow well understood laws of wave propagation, the production of a single mode is most often accomplished by designing a cavity 12 having a geometry that supports a single mode at a wavelength produced by the source 14. For example, in the United States, 2450 megahertz (MHz) is one of the regulated frequencies (wavelengths) reserved for laboratory microwave use. As used herein and generally well-understood in this field, the term "mode" refers to the permitted (i.e., with respect to principles of physics) electromagnetic field pattern within a cavity.

Microwave modes are generally referred to by the $TE_{n,l,m}$ designation (TE for the magnetic field) where the subscripts refer to the number of nulls in the propagated direction.

Cavities 12 that can support single modes are set forth in the art and are generally understood by those familiar with microwaves and their propagations. An exemplary cavity 12 for propagating a single mode of microwave radiation is set forth in U.S. Pat. No. 6,288,379, incorporated herein by reference. The invention is not, however, limited to single mode techniques or cavities.

Any appropriate microwave source 14 can be used that is consistent with the other aspects of the invention. Typical sources such as magnetrons, klystrons, or solid state sources, such as a Gunn diodes, can be used in the present invention. In an exemplary embodiment, the application of continuous microwave radiation is accomplished using a resonant inverter switching power supply as set forth in previously incorporated U.S. Pat. No. 6,288,379. Thus, the term "continuous" is used herein in a descriptive rather than an absolute sense and refers to applying radiation from a source while driving the source at a frequency greater than about 60 hertz. More preferably, the source is driven at a frequency greater than about 600 hertz, even more preferably at greater than about 6000 hertz, and most preferably at frequencies between about 10,000 and about 250,000 hertz. As described in the '379 patent, this permits the power to be applied at a more even level over a longer period of time than in conventional devices which operate on 50 cycle (typical in Europe) or 60 cycle alternating current (standard in the United States).

Because one of the goals of the invention is to provide visual information, in exemplary embodiments, the illumination source 20 is a visual illumination source. Preferred visual illumination sources include one or more of LEDs, fiber optic lights, fluorescent lights, incandescent lights, broad band light sources, and other visual light sources known in the art. The term "visual" is used herein in its ordinary sense with respect to illumination, i.e., the visible frequencies are those to which the human eye normally responds. Although exact boundaries can be arbitrary, visible wavelengths are functionally described as those falling between the infrared and ultraviolet portions of the electromagnetic spectrum. Described numerically, they fall between about 400 and 700 nanometers.

In the illustrated embodiment, the illumination source 20 includes the fiber optic light pipe 23 inserted into the cavity 12.

The means for visually observing the vessel 16 and its contents may be selected from a camera (video or still, and based on film, magnetic media, or digital media) 32, a spectrophotometer 34, and other visual observing means known in the art. A monitor 36 may also be used to display the output from the camera 32 or spectrophotometer 34. In an exemplary embodiment, a lens 28 is used to provide a preferred view, for example a wide angle view, of the inside of the cavity.

The invention may further include a processor 38 in signal communication with one or more of the camera 32, spectrophotometer 34 and monitor 36. Connectors 19 (processor to source), 27 (processor to spectrometer), 29 (processor to pressure transducer), 30 (processor to temperature monitor), and 31 (processor to monitor) schematically illustrate these relationships. The processor 38 is preferably capable of controlling the microwave source 14 either automatically or manually, in response to data received from one or more of the camera 32, spectrophotometer 34, and monitor 36. In a preferred embodiment, the processor controls the microwave source 14 in response to a predetermined monitored change detected by one or more of the camera 32, spectrophotometer 34, and computer 36.

The processor 38 can be selected from among widely available and well understood processors such as the Pentium® series from Intel® (Santa Clara, Calif.) that are commonly used in personal computers, or functionally equivalent processors from other sources such as AMD® (Sunnyvale, Calif.). In some cases, a commercially-available desktop or laptop computer can be programmed with software to carry out the desired control functions while in other circumstances, the processor can be used in cooperation with preprogrammed read only memory (ROM) for the same purpose. In either case, the skilled person can obtain and use the relevant processor without undue experimentation. General discussions of control circuits and logic and related devices and systems are widely available, with one common source being Dorf, *The Electrical Engineering Handbook*, 2d Ed. (1997, CRC Press), at pages 1104-1107, sections 43.6-43.7.

In exemplary embodiments, the means for preventing the illumination source from saturating the IR temperature detector 22 prevents infrared radiation emitted by the illumination source 20 from reaching the cavity 12. In one embodiment, the means for preventing the illumination source from saturating the IR temperature detector 22 is a filter 21 that removes IR radiation emitted by the illumination source 20. Preferred filters 21 include well-known and commercially available heat glass that filters IR radiation (e.g., HOYA™ glass—HA-30, San Jose, Calif.).

In another aspect, the invention is a method of carrying out microwave assisted chemical reactions by applying microwave radiation within a cavity, to a reaction vessel in the cavity, and reactants in the reaction vessel, while concurrently monitoring infrared radiation emitted from the reaction vessel and reactants to determine the temperature of the vessel contents and while concurrently illuminating and visually monitoring the reactants with wavelengths other than infrared wavelengths.

Although the term "vessel" is used herein with respect to both the instrument and method aspects of the invention, it will be understood that the invention is not limited to sealed or unsealed vessels of any particular size or shape. Additionally, the term vessel can include other physical arrangements for handling the reactants, including flow-through systems.

The temperature is preferably monitored using a device or method that does not interfere with the application and effectiveness of the microwave radiation. Thus, in preferred embodiments, temperature monitoring is carried out optically, by using an IR temperature sensor. An IR sensor is particularly useful when the frequencies being applied to supply energy to the reactants are other than IR, because the infrared sensor measures radiation emitted by the vessel or its contents and does not need to be in direct contact with the vessel. Accordingly, it can be positioned in a spot that does not interfere with the microwave radiation. Exemplary sources of such IR sensors include Luxtron® (Santa Clara, Calif.), Ircon® (Niles, Ill.), and Land Instruments International (Newtown, Pa.).

In another embodiment, the method includes placing reactants in a microwave-transparent vessel, potentially, but not necessarily, including placing the reactants in pressure-resistant vessels which can be sealed prior to the application of microwave radiation. The vessel and its contents are then placed into a microwave cavity and microwave radiation, preferably a continuous single mode of microwave radiation, is applied within the cavity to the vessel and its contents while concurrently externally cooling the vessel.

The method may also include the step of using various robotic transfers to both place the reactants in a microwave transparent vessel and to place the vessel and contents into a microwave cavity.

In a preferred embodiment, the microwave cavity, preferably a closed microwave cavity, is illuminated by a light source that emits at least in the visible wavelengths of the electromagnetic spectrum. In one embodiment, the illuminating step further includes filtering the visible light source to remove wavelengths emitted in the infrared region of the electromagnetic spectrum that would otherwise interfere with the temperature monitoring step. A preferred method for filtering the infrared wavelengths includes using a heat glass, such as HOYA™ glass—HA-30, to remove IR wavelengths.

In a different embodiment, the illuminating step uses a light source that does not emit in the infrared region of the electromagnetic spectrum. For example, white-emitting LED lamps emit over a combination of narrow ranges of visible wavelengths (red, green, and blue) and do not emit in the infrared region of the electromagnetic spectrum. Such lamps thereby avoid interfering with the IR temperature detector or measurement.

In one exemplary embodiment, illumination of the microwave cavity may be effected by inserting a fiber optic light pipe into a closed microwave cavity. It may be preferred to use a lens to provide a wider angle view of the inside of the cavity. The lens may be preferably placed on the cavity end of the illumination light source, for example the fiber optic pipe, to enhance a viewing angle.

In another embodiment, the invention further includes visually recording the reaction (e.g., video or still recording, and based on film, magnetic media, or digital media).

The invention provides the capability to moderate the microwave radiation in response to an observed change, either automatically or manually. The microwave radiation may be moderated in response to a monitored temperature change, a visually monitored change, or both. Additionally, it may be preferable to moderate the microwave radiation, either automatically or manually, in response to a predetermined monitored change.

In a manner consistent with other microwave devices and techniques, the instrument 10 can also include a pressure transducer 42 which is in pressure communication with the vessel 16 either directly or indirectly as schematically indicated by the line 43 in FIG. 1. In turn, the transducer 42 is in signal communication with the processor 38. In addition to providing information about the pressure in the vessel, the pressure measurement can be used in a control circuit to moderate the application of microwaves in a manner similar to that already described for temperature data and for visual observation data.

In yet another embodiment, the method may include directing the visually monitored output to a spectrophotometer. The spectrophotometer preferably monitors chemical changes in the reactants, such as absorbance, emission, turbidity, and precipitation, as well as other chemical changes recognizable by those having ordinary skill in the art.

In a preferred aspect, the invention is a method of carrying out microwave assisted chemical reactions. The method includes placing compositions—frequently reactants—in a microwave-transparent vessel, positioning the vessel and its contents inside a microwave cavity, and applying a continuous single mode of microwave radiation within the cavity and to the vessel and its contents. The method further includes concurrently monitoring infrared radiation emitted from the reactants to determine the temperature of the vessel contents while illuminating and visually monitoring the reactants to determine the progress of a reaction, as well as adjusting the microwave power in response to a monitored change in the reactants in the vessel.

It will be understood, of course, that although the term "reactants" is used frequently herein, the method is not limited to starting materials, but can be applied to any appropriate compositions.

In one embodiment, the microwave power may be adjusted either manually or automatically in response to the monitored change in the reactants in the vessel. Moreover, the microwave power may be adjusted in response to a change monitored by the temperature sensor or in response to a change monitored visually. Examples of visually monitored changes include changes in absorbance, emission, light scattering, turbidity, solids content, and other visual reaction changes recognized by those having ordinary skill in the art. In one embodiment, the microwave power may be adjusted, either manually or automatically, in response to a predetermined monitored change (e.g., when the reaction reaches a predetermined temperature or when a color change occurs).

In a further embodiment, the step of visually monitoring the reaction includes illuminating the reaction vessel and the reactants in the reaction vessel with a visual light source. The illuminating step further includes limiting the monitored IR wavelengths to IR wavelengths produced by the reaction with, for example, a filter or an LED as discussed above.

Figure 2:
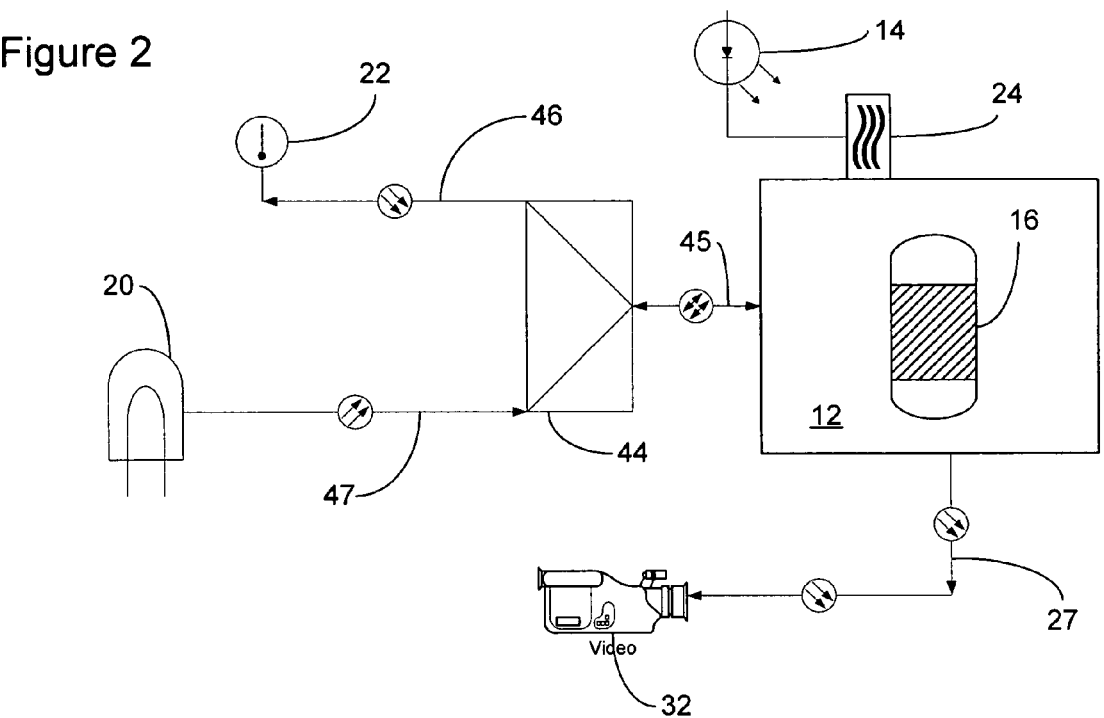
FIG. 2 is a schematic diagram of certain elements of an instrument in accordance with another embodiment of the invention.

FIG. 2 is another schematic diagram illustrating relevant portions of an alternative embodiment of the invention in which a modulator is incorporated to prevent infrared radiation from the illumination source 20 from interfering with the infrared temperature measurement. In FIG. 2, like elements carry like reference numerals. It will be understood that for the sake of clarity FIG. 2 is limited to portions of the instrument and that the instrument can also include any or all of the elements described with respect to FIG. 1.

Accordingly, FIG. 2 illustrates the cavity 12 and the vessel 16, along with the infrared temperature detector 22, and the illumination lamp 20. In order to prevent infrared wavelengths produced by the lamp 20 from interfering with the measurements of the infrared detector 22, in this embodiment the instrument includes the modulator 44 that is in optical communication with the cavity 12 through a single fiber optic connection 45. The modulator 44 is also in separate optical communication with the infrared detector 22 through the fiber optic 46 and with the lamp 20 through the fiber optic 47. The modulator 44 periodically (i.e., time-based) either directs radiation from the lamp 20 to the cavity, or radiation from the vessel to the infrared detector, but never both at the same time. Accordingly, an instrument incorporating the modulator 44 does not require an IR-blocking filter to eliminate interference between IR wavelengths generated by the vessel (and its contents) and those provided by the illumination source.

Because the visual frequencies are substantially unaffected by the infrared frequencies, the camera 32 (or other detector) and its related fiber optic 27 need not be included in the modulation system.

The use of the modulator 44 as the means for preventing the illumination source 20 from saturating the infrared detector 22 may result in intermittent periods of illumination and non-illumination in the cavity 12. During periods of non-illumination, the IR temperature detector 22 detects IR radiation emitted from the vessel 16 and its contents 18 without interference from IR radiation emitted by the illumination source 20.

In another aspect, the invention is a method of carrying out microwave assisted chemical reactions including applying a continuous single mode of microwave radiation within a cavity, preferably a closed cavity, and to a reaction vessel in the cavity and reactants in the reaction vessel. The method further includes intermittently monitoring infrared radiation emitted from the reaction vessel and the reactants to determine the temperature of the vessel contents; and intermittently illuminating and visually monitoring the reactants.

The method may also include placing the reactants in a vessel, preferably a pressure-resistant vessel, and sealing the vessel prior to the step of applying the microwave radiation. The step of applying microwave radiation preferably includes applying a continuous single mode of microwave radiation as previously discussed.

In preferred embodiments, the step of intermittently illuminating and visually monitoring the reactants comprises modulating a light source containing an IR component to allow intermittent visual observation and infrared temperature monitoring. The light source may be modulated by techniques known in the art including, but not limited to, shutters, filter wheels, switches, and combinations thereof.

In one embodiment, the step of illuminating the cavity includes inserting a fiber optic light pipe into a closed cavity. In an exemplary embodiment, a lens is used to provide a preferred view, for example a wide angle view, of the inside of the cavity.

The method preferably further includes visually recording the reaction, as previously discussed, with a camera. The method may also include moderating the microwave radiation in response to an observed change and directing the monitored output to a spectrophotometer to observe chemical changes within the reactants.

In describing the invention, it will be understood that a number of techniques are disclosed. Each of these has individual benefit, and each can also be used in conjunction with one or more, or in some cases all, of the other disclosed techniques. Accordingly, for the sake of clarity, this description refrains from repeating every possible combination of the individual steps in an unnecessary fashion. Nevertheless, the specification and claims should be read with the understanding that such combinations are entirely within the scope of the invention and the claims.

In another aspect, the invention comprises converting the image of the vessel and its contents into machine readable format, most typically digital format, and forwarding the formatted information to a processor. The processor is pre-programmed (hardware or software based) to control a reaction based upon the image The control function can be done based on the image input standing alone, or in conjunction with other types of input. In microwave assisted chemistry, the most typical additional measurable variables include the microwave power, the measured temperature of the reaction or the vessel (or both) and the measured pressure generated by a reaction in a vessel. The use of temperature or pressure or both to control reactions by moderating the application of microwave power through a control circuit has been discussed elsewhere; e.g., commonly assigned U.S. Pat. Nos. 6,866,408; 6,084,226; 5,840,583; and 5,796,080. In the present invention, the image information, when forwarded to the processor, is used in conjunction with the applied microwave power to make a change in their reaction, or with the temperature, or with the pressure, or with any two, or with all three of these variables.

For example, a color change standing alone can indicate a phase change or completion of a chemical reaction or sequence of chemical reactions. Accordingly, such color information when converted and forwarded to the processor, can be used to control (including starting, stopping, increasing, or decreasing) the microwave power.

The invention is not limited to just such a single point of analysis. To expand the example, the processor can be programmed to recognize a color change in combination with a set point temperature before making a change or a color change in combination with a set point pressure before making a change, or a color change in combination with both a specific set point temperature and a set point pressure before making a change.

In the same manner, the image, including a change in the image, can be used to signal completion of a reaction even if the reaction does not reach an expected set point temperature or set point pressure. For example, in the absence of the image information, controlling the endpoint of a desired reaction scheme would necessarily be based upon a particular set point temperature or set point pressure.

Using the invention, however, the image information provides evidence that the reaction was successfully completed before a normal set point pressure or temperature has been reached. In such cases, the image information provides the capability to recognize the completion of the reaction earlier than with either temperature or pressure measurements.

The invention further comprises compiling matching sets of data on a time basis throughout the desired course of a chemical reaction. In this aspect, digital images taken at specified times (once per minute, once per second, multiple times per second) can be precisely matched with the applied power, the measured temperature, and the measured pressure at the same specified times. Compiling such information is straightforward using processors of conventional capabilities and provides the working chemist with the ability to replay the progress of the entire reaction (or portions of the reaction as the chemist sees fit) on demand and repeatedly while also having the capability to compare the measured items to one another and to the image information on a time selected basis.

In another aspect, a mechanical object such as a magnetic stirring bar, can be added to a reaction vessel. In this aspect, the image information from the object provides secondary information about process parameters that may lack visual indicators. For example, a change in fluid viscosity may not otherwise change the image of the reactants or products. The change in behavior of the stirrer bar can, however, provide relevant information about viscosity. Thus, if the stirrer bar under a fixed magnetic field rotates at a known frequency at a recognized viscosity (for example of water) and then is observed during the reaction to rotate at a different frequency, the change in rotation frequency can be observed, digitized, and used to evaluate and predict or determine the viscosity or change in viscosity in the reaction vessel. Other examples will be recognized easily by those of ordinary skill in this art.

In a related aspect, the invention is a method of microwave assisted chemistry comprising applying microwave radiation to a reaction vessel and its contents, periodically measuring a variable selected from the group consisting of the temperature of the vessel and its contents and the pressure within the reaction vessel, periodically obtaining an image of the vessel and its contents, converting the obtained images to digital output, and moderating the application of microwaves to the vessel and its contents based on the digital image output and at least one of the periodic measurements of temperature and pressure.

In this aspect, the moderation of the application of microwaves can also be based upon the digital image output and both of the periodic measurements of temperature and pressure.

In preferred embodiments, the method comprises obtaining an image of the vessel and its contents in the visual wavelengths because, as noted earlier, these are different from the wavelengths of the applied microwaves and from the infrared wavelengths which are used with certain types of optical temperature detectors.

In this aspect, it will be understood that although a visual output can be produced for a user, the method comprises moderating the application of microwaves independently of, and potentially without, a visual display of the obtained images. Stated differently, the method does not require an operator to observe the visual image and then moderate the application of microwaves. Instead, the images are obtained and converted to digital output independent of the operator in order to moderate the application of microwaves.

Figure 3:
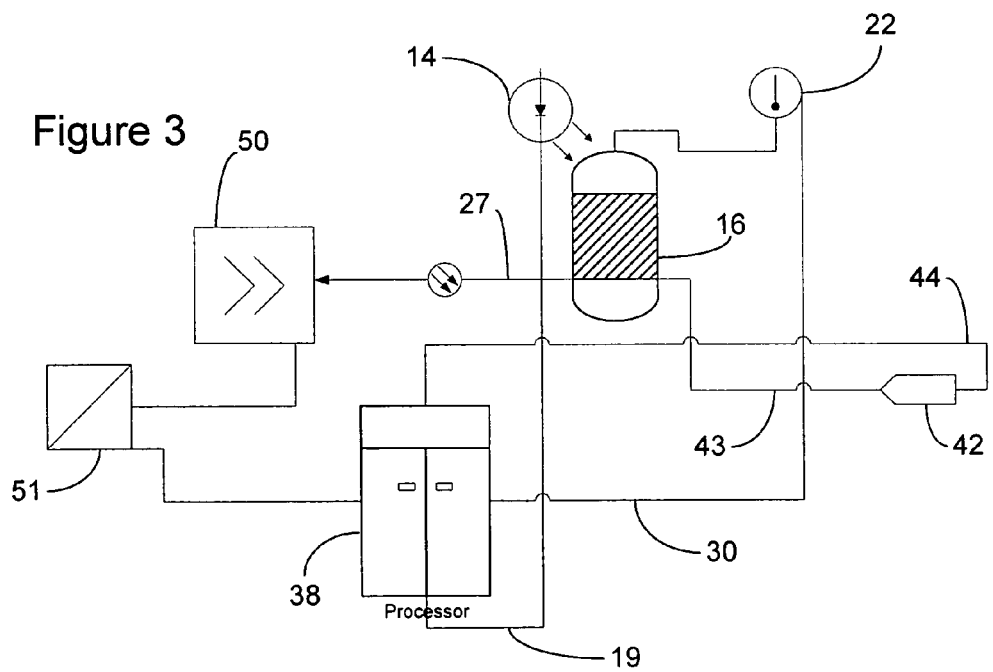
FIG. 3 is another schematic diagram of selected elements of an instrument in accordance with another embodiment of the invention.

FIG. 3 is another schematic illustration of some of the instrument aspects of this embodiment of the invention. Many of the elements of FIG. 3 are the same as those described with respect to FIGS. 1 and 2, and in such cases they carry the same reference numerals. Similarly, it will be understood that FIG. 3 is a schematic diagram of certain of the elements of the instrument and is not intended to illustrate all of the potential variations, but rather to highlight certain features. For example, FIG. 3 does not specifically illustrate a cavity, but it will be understood that microwaves are typically, even if not exclusively, applied to chemical compositions in reaction vessels in cavities.

Thus, FIG. 3 illustrates the microwave source illustrated as the diode 14, along with the temperature detector 22 for measuring the temperature of compositions in the instrument (FIG. 3 illustrates just the vessel 16) to which microwaves are applied from the source 14. A pressure transducer again indicated that 42 measures the pressure generated by compositions in the vessel 16 to which the microwaves are applied from the source 14.

In the embodiment illustrated in FIG. 3, however, the camera 32 (FIGS. 1 and 2) is replaced by the image detector 50 which is not necessarily a camera. The detector 50 is capable of obtaining images of compositions in the instrument while microwaves are being applied from the source 14, and is likewise capable of producing digital output that corresponds to the obtained images. Detectors that produce digital output based upon visible light, other wavelengths of light, or other analog input, are well understood and widely available in the art and can be selected or incorporated by those of skill in this art without undue experimentation. Accordingly, the detector 50 can have the capability to produce the digital output directly or, as illustrated in FIG. 3, it can be used in conjunction with an analog digital converter 51 for producing the digital output from the obtained images.

In this embodiment, the processor 38 is in signal communication with either the detector 50 or the converter 51, with the temperature detector 22, with the pressure detector 42, and with the microwaves source 14 for moderating the application of microwaves from the source 14 to the compositions in the instrument based upon the digital output from the detector (or converter), and in combination with at least one of the measured pressure and the measured temperature.

In particular, FIG. 3 illustrates that the processor 38 moderates the application of microwaves independent of any visual display (e.g., to an operator) of obtained images. Stated differently, the appearance of the vessel 16 and its contents can be translated directly into digital information for the processor 38 regardless of whether or not it is also displayed on a monitor (e.g. 36 in FIG. 1). Furthermore, because the processor 38 can operate independent of any visual display, the instrument can moderate the application of microwaves without any visual display of obtained images.

In another aspect, the invention is a method of microwave-assisted chemistry comprising obtaining an image of compositions during the application of microwave radiation to those compositions at specific time intervals, combined with measuring the temperature of the compositions at the same specific time intervals, and combined with measuring the pressure generated by the composition at the same specific time intervals. In this aspect, the microwave power applied to the compositions is also recorded at the same specific time intervals as the images and the other information are obtained. A recorded matrix is generated from the image, temperature, pressure and power information at the specific time intervals. Table 1 represents such a matrix.

TABLE 1

| Time | Image | Microwave Power | Measured Temperature | Measured Pressure |
| --- | --- | --- | --- | --- |
| $T_1$ | $(Image)1$ | $Watts_1$ | $°C_{.1}$ | $P_1$ |
| $T_2$ | $(Image)_2$ | $Watts_2$ | $°C_{.2}$ | $P_2$ |
| $T_3$ | $(Image)_3$ | $Watts_3$ | $°C_{.3}$ | $P_3$ |
| $T_4$ | $(Image)_4$ | $Watts_4$ | $°C_{.4}$ | $P_4$ |
| $T_5$ | $(Image)_5$ | $Watts_5$ | $°C_{.5}$ | $P_5$ |
| * * * | * * * | * * * | * * * | * * * |
| $T_x$ | $(Image)_x$ | $Watts_x$ | $C_{-x}$ | $P_x$ |

In many circumstances, the method will comprise obtaining images in the visible wavelengths, but it will be understood that other wavelengths could be used as desired or necessary depending upon the image detector and conversion equipment selected. As in the instrument aspects, the recorded matrix can be generated independent of any visual display of the obtained images. If visual images are not required by an operator (for example) for any other purposes, the method can comprise generating the recorded matrix without any visual display whatsoever of the obtained images.

Figure 4:
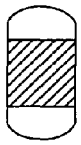
FIG. 4 is a schematic matrix illustrating the collection of data according to an embodiment of the invention.
Figure 4:
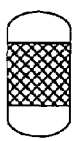
Figure 4:
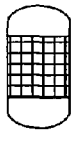
Figure 4:
Figure 4:
Figure 4:
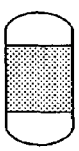
Figure 4:
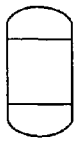

FIG. 4 is a schematic diagram of such a matrix. Seven time periods are illustrated and correspond to seven images obtained during the microwave-assisted chemical reaction. Each of the vessels in FIG. 4 is illustrated with a different pattern in order to schematically illustrate the potential appearance changes. It will be understood, of course, that as few as one image change over the course of a given reaction can be useful in the present invention and that the selected group of seven is taken arbitrarily for illustration purposes.

As illustrated in FIG. 4, each respective time interval-based image can be associated with a corresponding power level (W), temperature (T) and pressure (P). Using readily available processor power and conventionally available memory, the entire course of the reaction can be stored and then replayed on demand to obtain a better understanding of the interaction among and between the power, the temperature, the pressure, and the appearance of the starting materials, products, and intermediates.

In the drawing and specification, there has been set forth preferred embodiments of the invention, and although specific terms have been employed, they are used in a generic and descriptive sense only and not for purposes of limitation, the scope of the invention being defined in the claims.

The invention claimed is:

1. A method of carrying out microwave assisted chemical reactions, the method comprising:
    applying microwave radiation within a cavity and to a reaction vessel in the cavity and reactants in the reaction vessel;
    while concurrently monitoring infrared radiation emitted from the reaction vessel and reactants to determine the temperature of the vessel contents;
    while concurrently illuminating the vessel and reactants with visible wavelengths from a source of visible wavelengths;

while visually monitoring the reactants; and while preventing any infrared wavelengths from the source from saturating the infrared radiation emitted from the vessel and the reactants.

2. A method of carrying out microwave assisted chemical reactions according to claim 1, further comprising placing the reactants in a vessel and sealing the vessel prior to the step of applying the microwave radiation.

3. A method of carrying out microwave assisted chemical reactions according to claim 2 wherein the step of placing the reactants in a vessel comprises placing the reactants in a pressure-resistant vessel.

4. A method of carrying out microwave assisted chemical reactions according to claim 1 wherein the step of applying microwave radiation comprises applying a continuous single mode of microwave radiation.

5. A method of carrying out microwave assisted chemical reactions according to claim 4 wherein the step of applying a continuous single mode of microwave radiation comprises applying radiation from a source and driving the source at a frequency of greater than about 60 Hz.

6. A method of carrying out microwave assisted chemical reactions according to claim 1 wherein the step of applying microwave radiation comprises applying microwave radiation from a source selected from the group consisting of magnetrons, klystrons, and solid state sources.

7. A method of carrying out microwave assisted chemical reactions according to claim 1 wherein the step of visually monitoring the reactants comprises illuminating the reaction vessel and the reactants using a light source that includes the visible wavelengths.

8. A method of carrying out microwave assisted chemical reactions according to claim 7 wherein the illuminating step further comprises filtering wavelengths in the infrared region to thereby avoid saturating the cavity with infrared frequencies that would otherwise interfere with the temperature monitoring step.

9. A method of carrying out microwave assisted chemical reactions according to claim 7 wherein the illuminating step comprises illuminating the cavity from a visual light source that does not emit light in the infrared region of the electromagnetic spectrum.

10. A method of carrying out microwave assisted chemical reactions according to claim 1 wherein the illuminating and visually monitoring step comprises illuminating the interior of a closed cavity.

11. A method of carrying out microwave assisted chemical reactions according to claim 10 further comprising visually recording the reaction.

12. A method of carrying out microwave assisted chemical reactions according to claim 1 wherein the illuminating and visually monitoring step comprises inserting a fiber optic light pipe into a spectroscopy port in a closed microwave cavity.

13. A method of carrying out microwave assisted chemical reactions according to claim 12 further comprising monitoring through a lens.

14. A method of carrying out microwave assisted chemical reactions according to claim 13 wherein the step of monitoring through a lens comprises monitoring through a lens on the cavity end of the fiber optic light pipe to enhance a viewing angle.

15. A method of carrying out microwave assisted chemical reactions according to claim 1 further comprising moderating the microwave radiation in response to an observed reaction change.

16. A method of carrying out microwave assisted chemical reactions according to claim 1 wherein the step of visually monitoring the reactants comprises directing the monitored output to a spectrophotometer.

* * * * *